(12) United States Patent
Liu

(10) Patent No.: US 11,532,416 B1
(45) Date of Patent: Dec. 20, 2022

(54) MAGNETIC LEVITATION DEVICE

(71) Applicant: Te-Wei Liu, Taipei (TW)

(72) Inventor: Te-Wei Liu, Taipei (TW)

( * ) Notice: Subject to any disclaimer, the term of this patent is extended or adjusted under 35 U.S.C. 154(b) by 0 days.

(21) Appl. No.: 17/472,742

(22) Filed: Sep. 13, 2021

(51) Int. Cl.
*H01F 7/02* (2006.01)
*F16C 32/04* (2006.01)

(52) U.S. Cl.
CPC ....... *H01F 7/0236* (2013.01); *F16C 32/0423* (2013.01)

(58) Field of Classification Search
CPC .......................... H01F 7/0236; F16C 32/0423
USPC ........................................................ 335/285
See application file for complete search history.

(56) References Cited

U.S. PATENT DOCUMENTS

| | | | | |
|---|---|---|---|---|
| 2,305,416 | A * | 12/1942 | Hansen, Jr. ........... | F16C 39/063 310/90.5 |
| 2,747,944 | A * | 5/1956 | Baermann .............. | G01R 11/14 416/174 |
| 5,302,874 | A * | 4/1994 | Pinkerton ........... | F16C 32/0436 310/90.5 |
| 6,218,751 | B1 * | 4/2001 | Bohlin ................... | G01N 11/14 310/91 |
| 8,823,233 | B2 * | 9/2014 | Post ..................... | F16C 32/0436 310/90.5 |
| 2012/0013215 | A1 * | 1/2012 | Aronstam ............... | F16C 17/02 310/90.5 |

\* cited by examiner

*Primary Examiner* — Alexander Talpalatski
(74) *Attorney, Agent, or Firm* — Bacon & Thomas, PLLC

(57) ABSTRACT

A magnetic levitation device as a toy or a bearing is provided. The magnetic levitation device has an inner component and an outer component. Multiple magnet rings are mounted on the inner component and multiple magnet rings are mounted on the outer component. The magnet rings on the inner component attract the magnet rings on the outer component. Multiple pulley assemblies are mounted on the outer component. An elastic component is connected with a center pulley. The two ropes are wrapped on the center pulley. One end of each one of the ropes is mounted on one of the fixing points that is connected to one of the magnet rings mounted on the outer component and another one end of the rope is mounted on a reactive pulley. With such structure, the outer component may levitate from the inner component and the pulley assemblies can balance the entire device.

7 Claims, 13 Drawing Sheets

MAGNETIC LEVITATION DEVICE

BACKGROUND OF THE INVENTION

1. Field of the Invention

The present invention relates to an application of magnetic levitation principle, especially to a magnetic levitation bearing.

2. Description of the Prior Arts

One of the advantages of the magnetic levitation device is that the friction therein is extremely low. If the magnetic levitation device can be widespread in the field of mechanism, the efficiency of the mechanism may be improved significantly.

However, to keep a magnetic levitation component in a correct position is very difficult. The forces for constraining the magnetic levitation component may be combined into two resultants perpendicular to each other, which are a horizontal resultant and a vertical resultant, respectively. To firmly constrain the horizontal position of the magnetic levitation component, a large amount of the horizontal forces may be used for composing the horizontal resultant. But, correspondingly, any slight interference may cause a large vertical force. Therefore, to balance the entire system the vertical force must be increased, which further increases the difficulty of balance. In other words, if horizontal forces are balanced, vertical forces may not be balanced easily.

Another factor makes keeping position so hard is that an intensity of the magnetic force is inversely proportional to the square of the distance therebetween, which causes the current magnetic levitation device unable to balance by itself. Therefore, an external assistance should be disposed To overcome the shortcomings, the present invention provides a magnetic levitation device to mitigate or obviate the aforementioned problems.

SUMMARY OF THE INVENTION

The main objective of the present invention is to provide a magnetic levitation device that can balance the horizontal resultant and the vertical resultant by itself.

The magnetic levitation device comprises an inner component, a first magnet ring, two groups of second magnet rings, two third magnet rings, an outer component, a center magnet ring, two active magnet rings, two reactive magnet rings, a plurality of pulley assemblies, and two ropes. The outer component is sleeved on the inner component and a space is formed between the outer component and the inner component. The inner component and the outer component are rotatable with respect to each other. The first magnet ring, the second magnet rings, and the third magnet rings are securely mounted on the inner component. The first magnet ring is located between the two groups of the second magnet rings. Each group of the second magnet rings comprises a closer second magnet ring and a remoter second magnet ring. The closer second magnet ring and the remoter second magnet ring are securely mounted on the inner component. A distance between the remoter second magnet ring and the first magnet ring is larger than a distance between the closer second magnet ring and the first magnet ring. An interval is formed between the closer second magnet ring and the remoter second magnet ring. The first magnet ring is located between the two third magnet rings. A distance between each one of the third magnet rings and the first magnet ring is smaller than a distance between each group of the second magnet rings and the first magnet ring. A center magnet ring is securely mounted on the outer component. The center magnet ring is attracted by the first magnet ring. The two active magnet rings are moveably mounted on the outer component and respectively located in the intervals of the two groups of second magnet rings. Each one of the active magnet rings is attracted by the closer second magnet ring and the remoter second magnet ring of the corresponding group of the second magnet rings. The two reactive magnet rings are moveably mounted on the outer component. A distance between the two reactive magnet rings is smaller than a distance between the two third magnet rings. The two reactive magnet rings are respectively attracted by the two third magnet rings. A plurality of pulley assemblies is mounted on the outer component. Each one of the pulley assemblies comprises a center pulley, two fixing points, two reactive pulleys, and an elastic component. The center pulley is securely mounted on the outer component and aligned to the center magnet ring. The two fixing points are connected with a respective one of the active magnet rings and thereby each one of the fixing points is capable of being synchronously moved with the connected active magnet ring. The two reactive pulleys are connected with a respective one of the reactive magnet rings and thereby each one of the reactive pulleys is capable of being synchronously moved with the connected reactive magnet ring. An elastic component is connected with the center pulley. The two ropes are wrapped on the center pulley. One end of each one of the ropes is mounted on one of the fixing points and another one end of said rope is mounted on one of the reactive pulleys.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
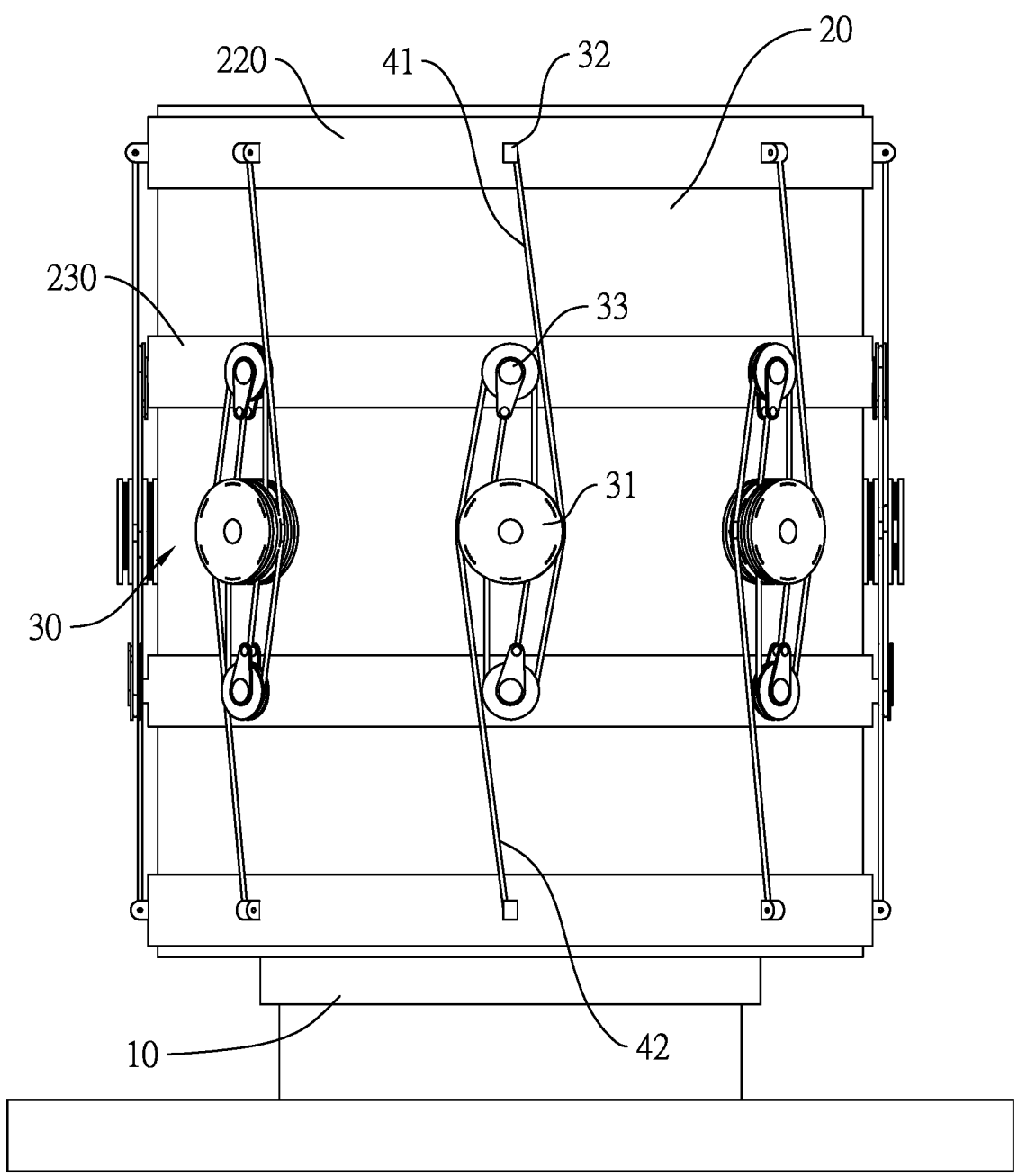
FIG. 1 is a side view of a magnetic levitation device in accordance with a first embodiment of the present invention.
Figure 2:
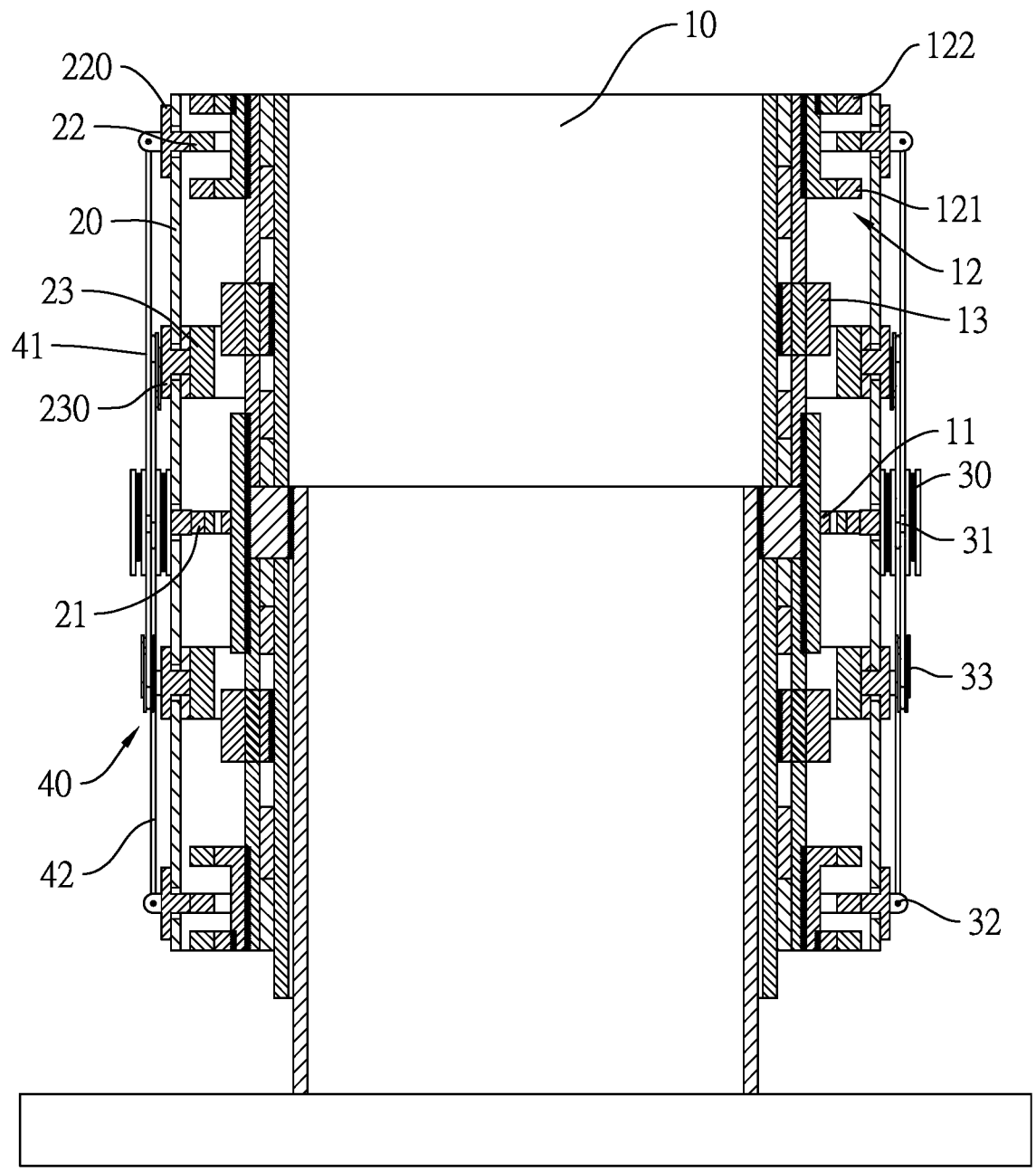
FIG. 2 is a sectional view of the magnetic levitation device in FIG. 1.

With reference to FIG. 1 and FIG. 2, a magnetic levitation device in accordance with a first embodiment of the present invention is provided. The magnetic levitation device can be used as a toy or a bearing in mechanism. The magnetic levitation device comprises an inner component 10, an outer component 20, a first magnet ring 11, two groups of second magnet rings 12, two third magnet rings 13, a center magnet ring 21, two active magnet rings 22, two reactive magnet rings 23, a plurality of pulley assemblies 30, and two ropes 41 and 42. In this embodiment, the magnetic levitation device may further comprise two active assembling rings 220 and two reactive assembling rings 230.

The inner component 10 may be a sleeve or a cylinder sleeved coaxially by the outer component 20. In this embodiment, the axis of the inner component 10 and the outer component 20 is vertical; but it is not limited thereto, the axis may be horizontal or inclined. A space is formed between the outer component 20 and the inner component 10; in other words, the inner component 10 and the outer component 20 do not contact each other. Therefore, the inner component 10 and the outer component 20 are capable of frictionlessly rotating with respect to each other. In another embodiment, the inner component 10 and the outer component 20 may be further capable of frictionlessly moving with respect to each other.

In this embodiment, the inner component 10 is securely mounted on a base and the outer component 20 can freely rotate with respect to the inner component 10. In another embodiment, the outer component 20 is securely mounted on a base, and the inner component 10 can freely rotate with respect to the outer component 20.

Figure 3:
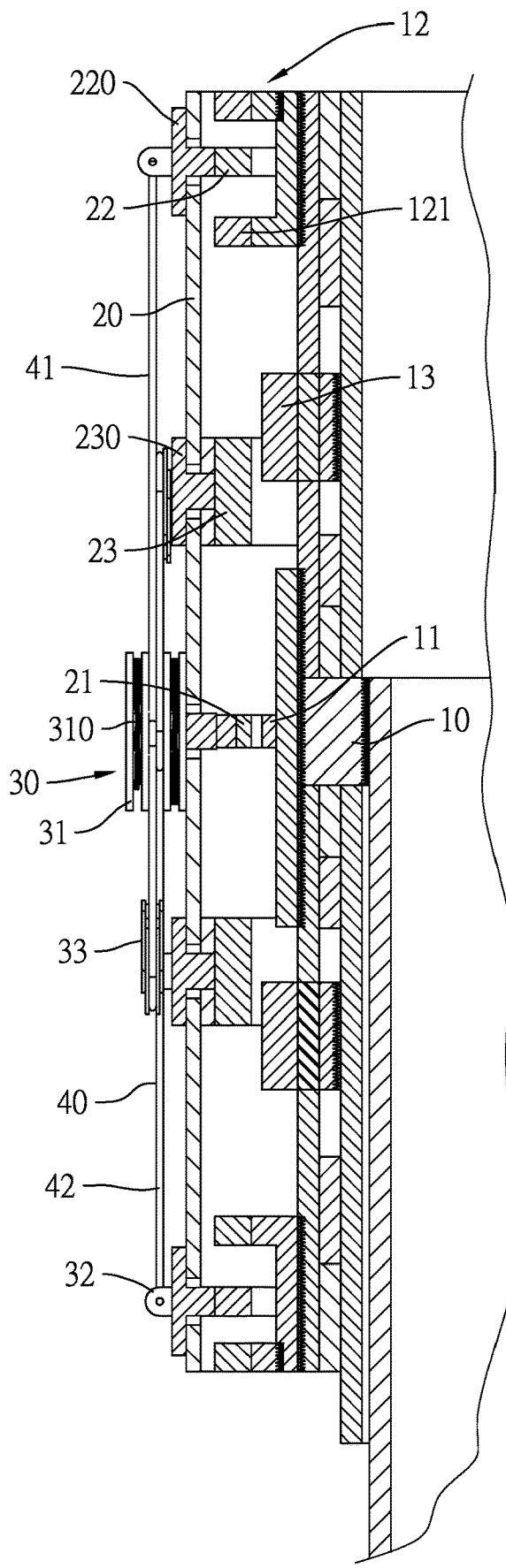
FIG. 3 is an enlarged sectional view of the magnetic levitation device in FIG. 2.
Figure 4:
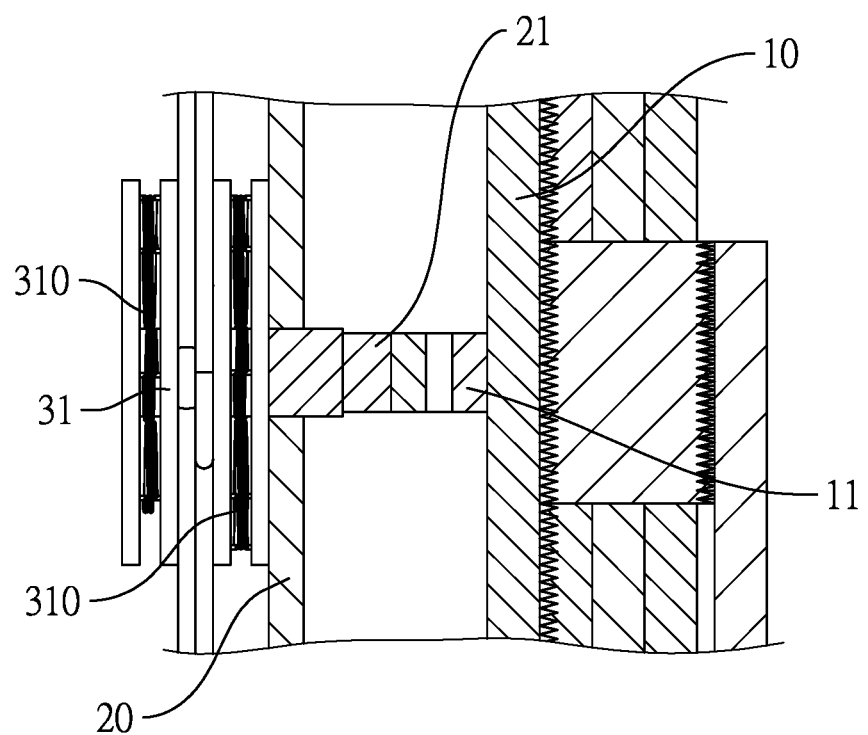
FIG. 4 is an enlarged sectional view of a first magnet pair of the magnetic levitation device in FIG. 2.

Please refer to FIG. 3 and FIG. 4. In this embodiment, the first magnet ring 11, the second magnet rings 12, the third magnet rings 13, the center magnet ring 21, the active magnet rings 22, and the reactive magnet rings 23 extend horizontally. In other words, axes of the first magnet ring 11, the second magnet rings 12, the third magnet rings 13, the center magnet ring 21, the active magnet rings 22, and the reactive magnet rings 23 are the same and vertical with respect to the ground.

The first magnet ring 11, the second magnet rings 12, and the third magnet rings 13 are securely mounted on the inner component 10. The first magnet ring 11 is located between the two groups of the second magnet rings 12. Besides, the first magnet ring 11 is also located between the two third magnet rings 13. A distance between each one of the third magnet rings 13 and the first magnet ring 11 is smaller than a distance between each group of the second magnet rings 12 and the first magnet ring 11. In other words, each group of the second magnet rings 12 is outer than the third magnet rings 13 with respect to the first magnet ring 11.

Figure 5:
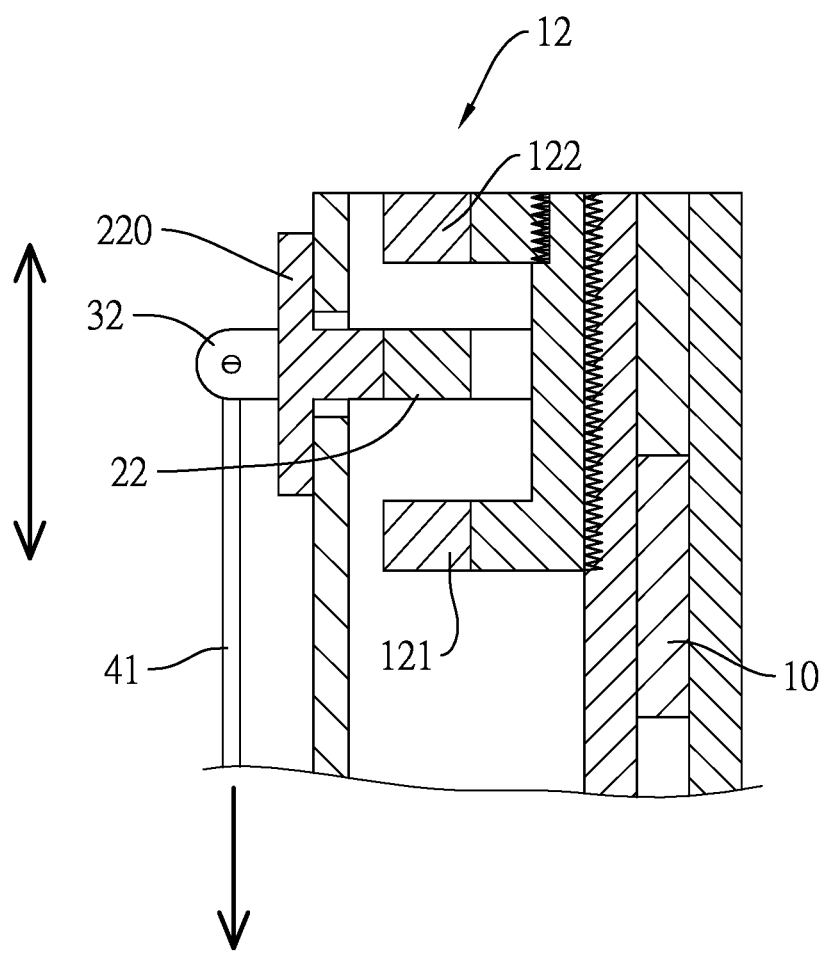
FIG. 5 is an enlarged sectional view of an upper second magnet pair of the magnetic levitation device in FIG. 2.

Please also refer to FIG. 5. Each group of the second magnet rings 12 comprises two magnet rings, i.e., a closer second magnet ring 121 and a remoter second magnet ring 122. The closer second magnet ring 121 and the remoter second magnet ring 122 are securely mounted on the inner component 10. A distance between the remoter second magnet ring 122 and the first magnet ring 11 is larger than a distance between the closer second magnet ring 121 and the first magnet ring 11. In other words, the remoter second magnet ring 122 is outer than the closer second magnet ring 121 with respect to the first magnet ring 11. An interval is formed between the closer second magnet ring 121 and the remoter second magnet ring 122.

A center magnet ring 21 is securely mounted on the outer component 20 and attracted by the first magnet ring 11. A diameter of the center magnet ring 21 is larger than that of the first magnet ring 11 and the center magnet ring 21 aligns to the first magnet ring 11, so the center magnet ring 21 encloses the first magnet ring 11.

The two active magnet rings 22 are mounted on the outer component 20 and are capable of being moved in an axial direction. The two active magnet rings 22 are respectively located in the intervals of the two groups of the second magnet rings 12 and each one of the active magnet rings 22 is attracted by the closer second magnet ring 121 and the remoter second magnet ring 122 of the corresponding group of the second magnet rings 12. In other words, the center magnet ring 21 is located between the two active magnet rings 22. Besides, each active magnet ring 22 is attracted outward with respect to the center magnet ring 21 by the corresponding group of the second magnet rings 12. If any one of the active magnet rings 22 is moved outward, the outward attractive magnet force is increased correspondingly; if any one of the active magnet rings 22 is moved inward, the outward attractive magnet force is decreased correspondingly.

Figure 6:
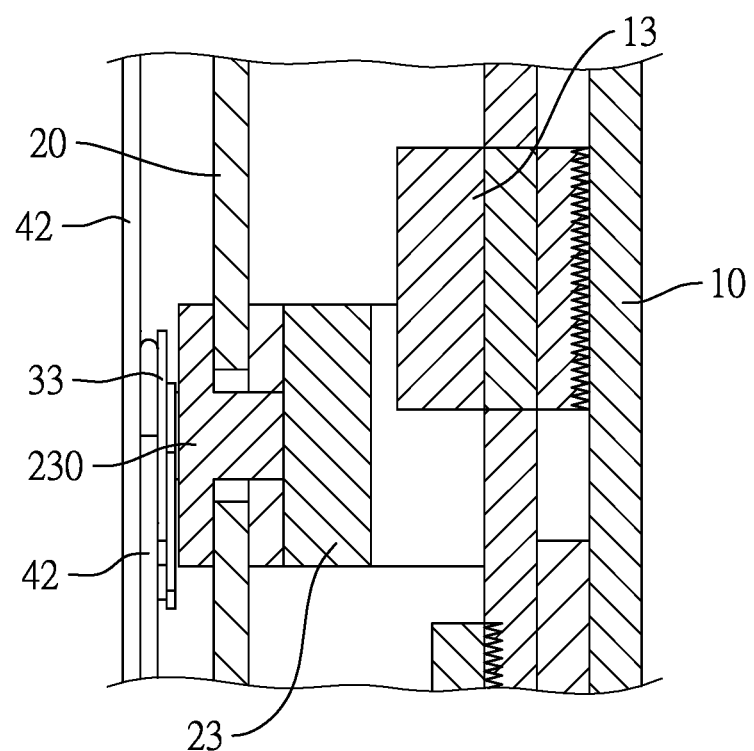
FIG. 6 is an enlarged sectional view of an upper third magnet pair of the magnetic levitation device in FIG. 2.

Please also refer to FIG. 6. The two reactive magnet rings 23 are mounted on the outer component 20 and are capable of being moved in the axial direction. The two reactive magnets are located between the two active magnet rings 22, and the center magnet ring 21 is located between the two reactive magnet rings 23. A distance between the two reactive magnet rings 23 is smaller than a distance between the two third magnet rings 13, and the two reactive magnet rings 23 are respectively attracted by the two third magnet rings 13. Besides, each reactive magnet ring 23 is attracted outward with respect to the center magnet ring 21 by the corresponding third magnet ring 13. Further, the vertical positions only affect the changes of the magnet forces to reactive magnet rings 23 slightly, so hereinafter the magnet forces between the reactive magnet rings 23 and the third magnet rings 13 are regarded as constant in the vertical direction.

Precisely, in the upper third magnet pair, for example, the north pole and the south pole of the reactive magnet ring 23 are arranged vertically, the north pole of the reactive magnet ring 23 points upward, and the south pole of the third magnet ring 13 points downward. Similarly, the north pole and the south pole of the third magnet ring 13 are arranged vertically, the north pole of the third magnet ring 13 points downward, and the south pole of the third magnet ring 13 points upward. Because the orientations of the magnet poles of the reactive magnet ring 23 and the third magnet ring 13 are parallel but inverse to each other, there exists a position that generates the maximum attractive magnet force in the vertical direction. At that position, the displacement of the reactive magnet ring 23 only causes a slight change in attractive magnet force, so the magnet forces between the reactive magnet rings 23 and the third magnet rings 13 are regarded as constant in the vertical direction.

Please refer to FIG. 3 to FIG. 6. The first magnet ring 11 and the center magnet ring 21 may be defined as a first magnet pair. In the first magnet pair, both the first magnet ring 11 and the center magnet ring 21 are permanent magnets. The groups of the second magnet rings 12 and the active magnet rings 22 may be defined as two second magnet pairs. In each one of the second magnet pairs, both the groups of the second magnet rings 12 and the active magnet rings 22 are permanent magnets. The third magnet rings 13 and the reactive magnet rings 23 may be defined as two third magnet pairs. In the third magnet pair, both the third magnet ring 13 and the reactive magnet ring 23 are permanent magnets.

The two active assembling rings 220 and the two reactive assembling rings 230 are mounted on the outer component 20, and the active assembling rings 220 and the reactive assembling rings 230 are capable of being individually moved in the axial direction.

Precisely, the active assembling rings 220 are mounted on an outer side of the outer component 20, the active magnet rings 22 are mounted on an inner side of the outer component 20, and the outer component 20 forms multiple grooves so that the active assembling rings 220 are connected to a respective one of the active magnet rings 22 via the grooves.

The reactive assembling rings 230 are mounted on the outer side of the outer component 20, the reactive magnet rings 23 are mounted on the inner side of the outer component 20, and the reactive assembling rings 230 are connected to a respective one of the reactive magnet rings 23 via the grooves. Therefore, each one of the active assembling rings 220 is capable of being synchronously moved in the axial direction with the corresponding active magnet ring 22 and each one of the reactive assembling rings 230 is capable of being synchronously moved in the axial direction with the corresponding reactive magnet ring 23.

Figure 7:
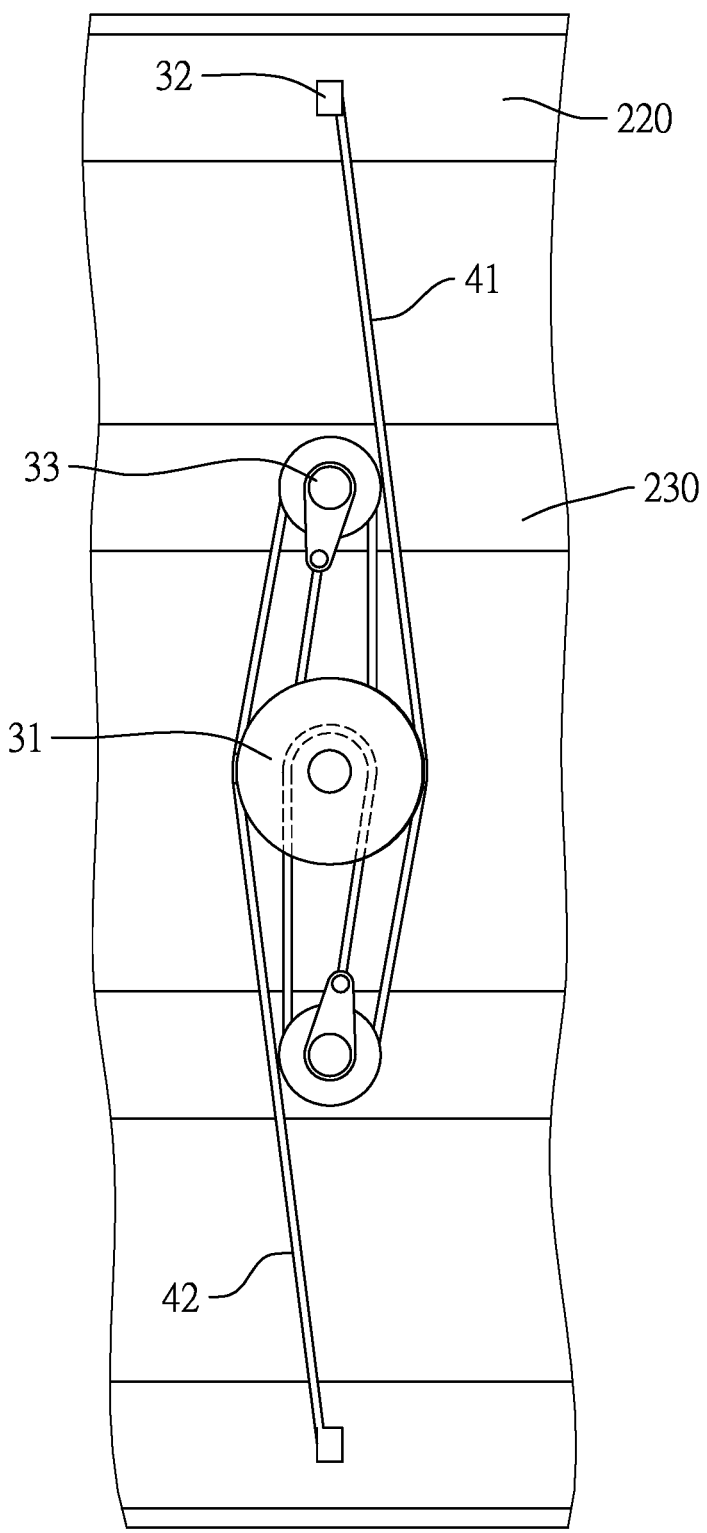
FIG. 7 is an enlarged side view of a pulley assembly of the magnetic levitation device in FIG. 2.
Figure 8:
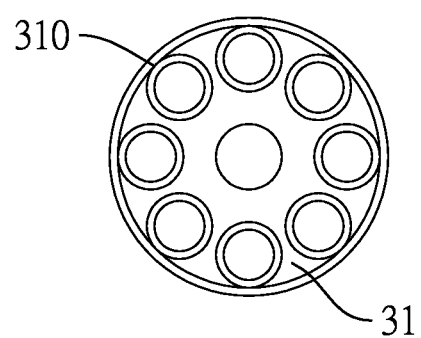
FIG. 8 is a perspective view of an elastic component of the pulley assembly of the magnetic levitation device in FIG. 7.

Please refer to FIG. 3, FIG. 7, and FIG. 8. The pulley assemblies 30 are mounted on the outer component 20. Each one of the pulley assemblies 30 comprises a center pulley 31, an elastic component 310, two fixing points 32, and two reactive pulleys 33.

The center pulley 31 is securely mounted on the outer component 20 and aligned to the center magnet ring 21. The elastic component 310 is connected with the center pulley 31 and thereby exerts a bias torque on the center pulley 31. If the center pulley 31 is rotated clockwise, the torque is increased correspondingly; if the center pulley 31 is rotated counterclockwise, the torque is decreased correspondingly.

The two fixing points 32 of each pulley assembly 30 are connected with a respective one of the active magnet rings 22 and thereby each one of the fixing points 32 is capable of being synchronously moved with the connected active magnet ring 22. In this embodiment, the two fixing points 32 of each pulley assembly 30 are securely mounted on a respective one of the active assembling rings 220 and connected to the active magnet rings 22 via the active assembling rings 220. Therefore, each active magnet ring 22, the corresponding active assembling ring 220, and the corresponding fixing points 32 can be moved synchronously and tend to be moved outward by the corresponding group of the second magnet rings 12.

The two reactive pulleys 33 are connected with a respective one of the reactive magnet rings 23 and thereby each one of the reactive pulleys 33 is capable of being synchronously moved with the connected reactive magnet ring 23. In this embodiment, the two reactive pulleys 33 of each pulley assembly 30 are securely mounted on a respective one of the reactive assembling rings 230 and connected to the reactive magnet rings 23 via the reactive assembling rings 230. Therefore, each reactive magnet ring 23, the corresponding reactive assembling ring 230, and the corresponding reactive pulleys 33 can be moved synchronously and tend to be moved outward by the corresponding third magnet ring 13.

The two ropes 41 and 42 are individually wrapped on the center pulley 31, one end of each one of the ropes 41 and 42 is mounted on a respective one of the fixing points 32, and another one end of said rope 41 or 42 is mounted on a respective one of the reactive pulleys 33. In this embodiment, the fixing point 32 and the reactive pulley 33 that are connected by the same rope 41 or 42 are located opposite with respect to the center pulley 31. In other words, the two ends of each rope 41 and 42 are mounted on two opposite sides with respect to the center pulley 31. In this embodiment, the rope 41 connects the upper fixing point 32 and the lower reactive pulley 33, and the rope 42 connects the lower fixing point 32 and the upper reactive pulley 33.

Besides, each rope 41 and 42 is wrapped one time on the center pulley 31 and one time on the connected reactive pulley 33. As a result, each one of the reactive pulleys 33 bears three times tension the corresponding fixing point 32 via the rope 41 or 42. Moreover, because both the active assembling ring 220 and the reactive assembling rings 230 tend to move outward, the ropes 41 and 42 are under tension. Further, with the center pulley 31 undergoing the bias torque, the ropes 41 and 42 keep inward pulling the connected reactive pulleys 33.

With such structure, the magnet force can levitate the outer component 20 from the inner component 10 stably and the outer component 20 is capable of balancing internal forces therein or returning to a neutral position even confronts an interference. Besides, because the capacity of bearing interference is not unlimited, in a preferred embodiment, the outer component 20 is constrained in a predetermined space, which prevents the magnetic levitation device from collapsing. The following description demonstrates that the magnetic levitation device undergoes interference within its capacity.

Figure 9A:
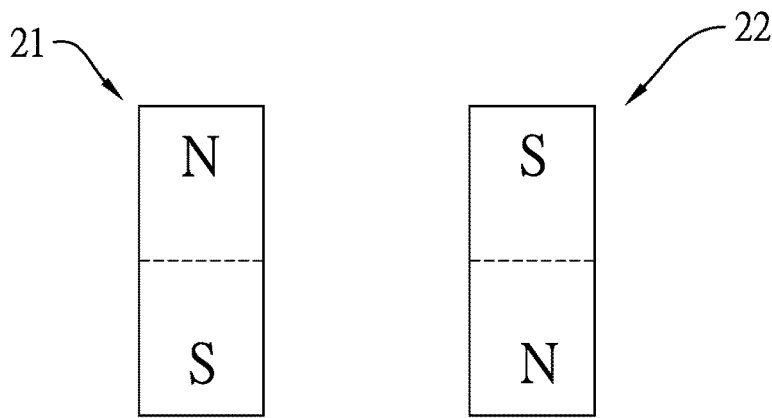
FIGS. 9A to 9C are simplified schematic views of the first magnet pair of the magnetic levitation device in FIG. 2, showing the various positions of the center magnet ring and the changes of the force therebetween correspondingly.
Figures 10A, 10B, 10C:
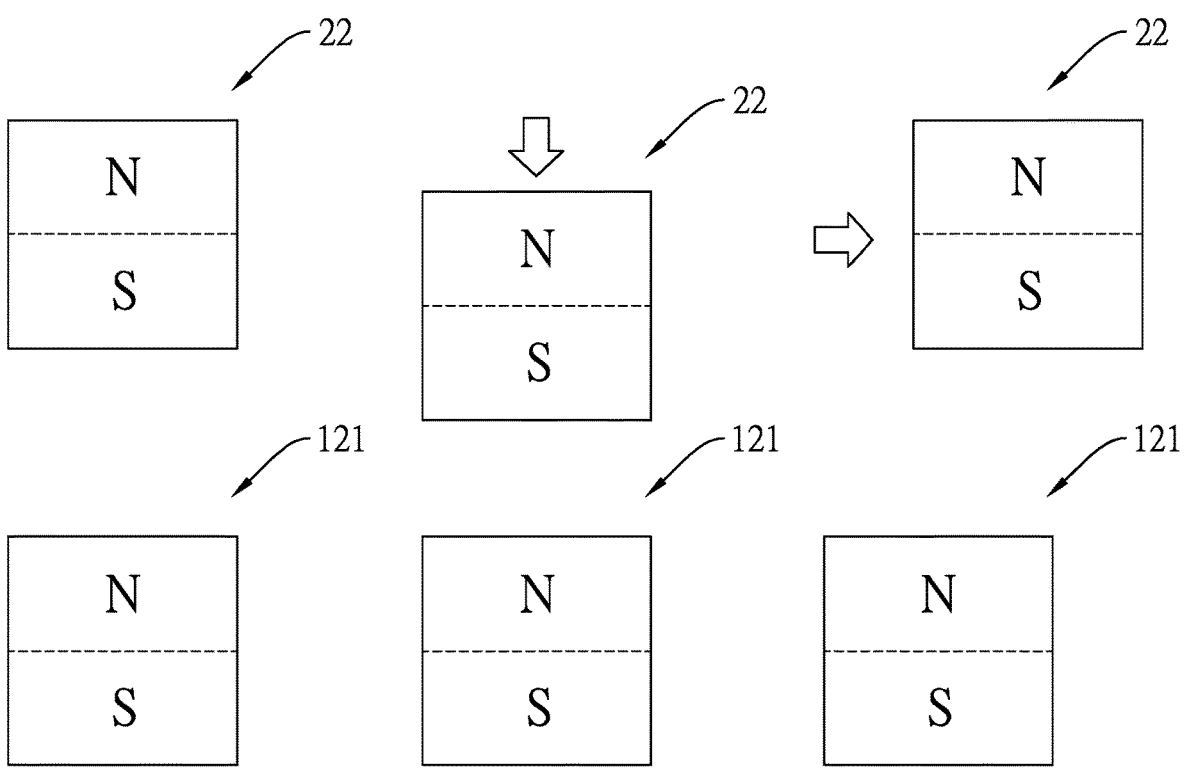
FIGS. 10A to 10C are simplified schematic views of the second magnet pair of the magnetic levitation device in FIG. 2, showing the various positions of the active magnet ring and the changes of the force therebetween correspondingly.
Figure 11A:
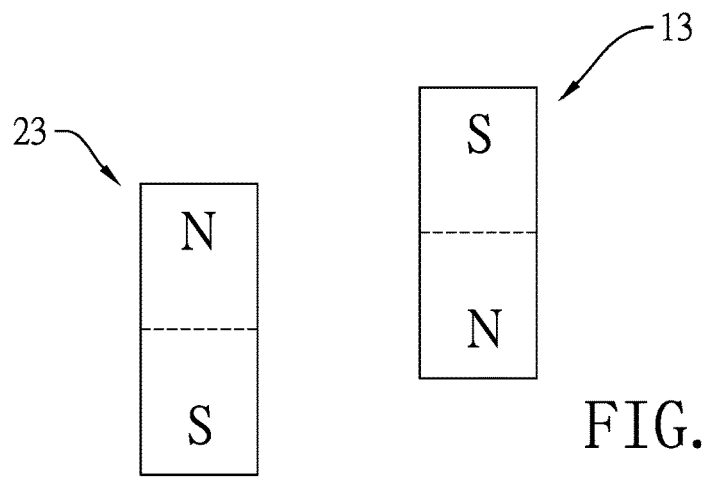
FIGS. 11A to 11C are simplified schematic views of the third magnet pair of the magnetic levitation device in FIG. 2, showing the various positions of the reactive magnet rings and the changes of the force therebetween correspondingly.

Please refer to FIG. 9A, FIG. 10A, and FIG. 11A. If the magnetic levitation device is in a neutral state, all forces are balanced and both of the horizontal resultant and the vertical resultant are zero. The outer component 20, the active assembling rings 220, the reactive assembling rings 230, the active magnet rings 22, and the reactive magnet rings 23 are located at their respective neutral positions.

Figure 9B:
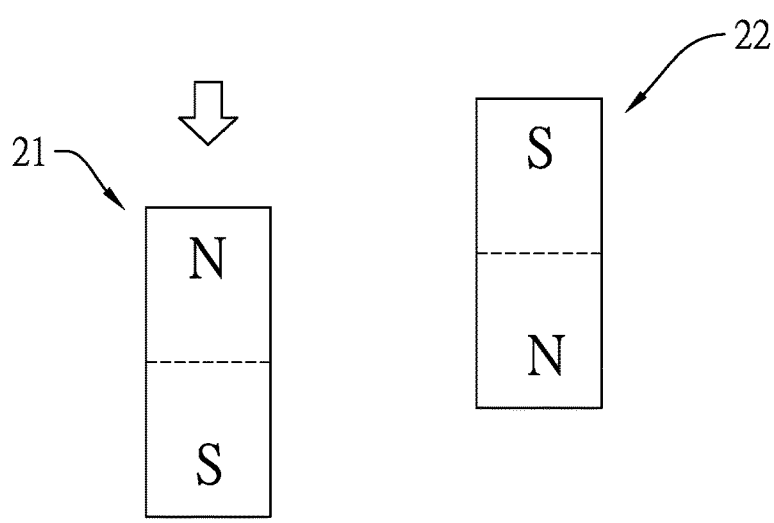

Please refer to FIG. 9A and FIG. 9B. In Situation A, if an interference exerts at the magnetic levitation device and the outer component 20 is moved vertically, the center pulley 31 will be moved along with the outer component 20. For example, the outer component 20 and the center pulley 31 may be moved downward. Then, the rope 41 is loosened but the rope 42 is tightened so the rope 41 and the rope 42 exert opposite forces on the center pulley 31, which makes the center pulley 31 unable to rotate. Therefore, the rope 41 and the rope 42 pull the two fixing points 32 and the two reactive pulleys 33 to move together but the center pulley 31, the two fixing points 32, and the two reactive pulleys 33 are not moved with respect to each other.

Meanwhile, the center magnet ring 21, the active magnet rings 22, and the reactive magnet rings 23 are also moved together but are not moved with respect to each other. Further, in the first magnet pair, when the first magnet ring 11 deviates from its original position, the attractive magnet force is generated to pull the first magnet ring 11 back (i.e. upward in this example). In the upper second magnet pair, the attractive magnet force upward drawing the upper active magnet ring 22 is decreased, and, in the lower second magnet pair, the attractive magnet force downward drawing the lower active magnet ring 22 is increased; therefore, the change of the resultant force is downward. In the third magnet pair, the change of the resultant force can be ignored. Because the change in the first magnet pair is larger than that in the second magnet pair, all components can be pulled back to their original positions.

Figure 11B:
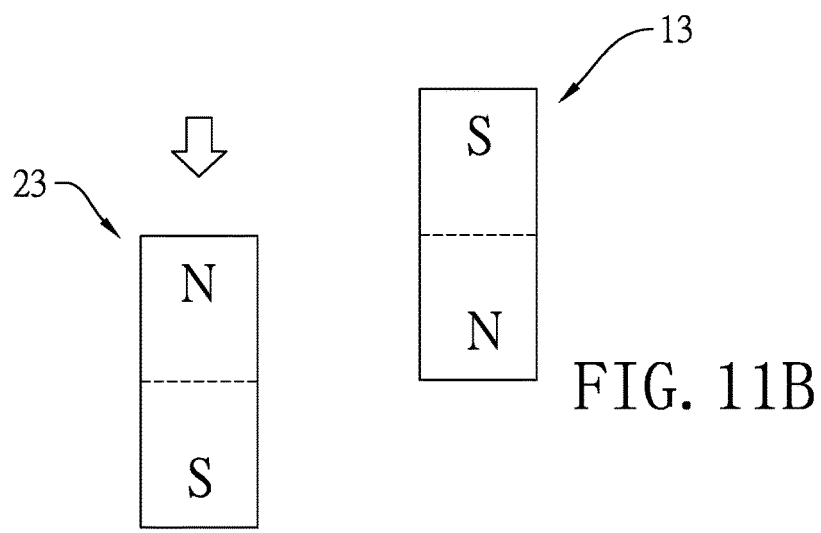

Please refer to FIG. 10A and FIG. 10B. In Situation B, if an interference exerts at the magnetic levitation device and the upper active magnet ring 22 is moved downward (as shown in FIG. 10B), the upper active assembling ring 220 will be moved correspondingly. Then, the rope 41 is loosened, the center pulley 31 is rotated clockwise, and the lower reactive pulley 33 is moved downward (as shown in FIG. 11B). Then, because the center pulley 31 is rotated, the upper reactive pulley 33 is moved upward and the lower active magnet ring 22 is moved upward.

Precisely, when the upper fixing point 32 is located at its original position, because of the corresponding active magnet ring 22 and the second magnet ring 12, the upper fixing point 32 bears upward force 50 N (as shown in FIG. 10A). In the neutral state, the elastic component 310 pulls each reactive pulley 33 through the center pulley 31 and the ropes 41 or 42 by 200 N; in other words, the elastic component 310 provides 400 N totally.

When the lower reactive pulley 33 is located at its original position (as shown in FIG. 11A), because of the corresponding reactive magnet ring 23 and the third magnet ring 13, the lower reactive pulley 33 bears downward force 350 N vertically. After the upper fixing point 32 is moved downward by an interference (as shown in FIG. 10B), the upper fixing point 32 bears an upward force 25 N and thus the rope 41 is under tension 25 N. Then, because the tension of the rope 41 is decreased, the lower reactive pulley 33 is moved downward by the lower reactive magnet ring 23 (as shown in FIG. 11B). Meanwhile, the center pulley 31 is rotated clockwise and thus the force pulls the lower reactive pulley 33 upward is increased. In this example, because the change of the force generated by the lower reactive magnet ring 23 can be ignored, the lower reactive pulley 33 still undergoes 350 N upward. Finally, in view of the lower reactive pulley 33, the three 25 N forces from the rope 41 are downward, so the force from the elastic component 310 in the center pulley 31 is increased to 275 N (i.e., 350-25*3=275). Thus, the forces related to the rope 41 are balanced. Further, because the center pulley 31 is rotated clockwise, the lower active magnet ring 22 is pulled upward and the magnet force on it is also decreased to 25 N. Symmetrically, the force from the elastic component 310 to the upper reactive pulley 33 is increased to 275 N (i.e. the elastic component 310 provides 550 N totally). Thus, the forces related to the rope 42 are also balanced and the entire magnetic levitation device is balanced.

Oppositely, if, in the beginning, an interference exerts at the magnetic levitation device and the upper active magnet ring 22 is moved upward, the tension on the rope 41 may be increased to 75 N. Then, the lower reactive pulley 33 is pulled upward and the center pulley 31 is rotated counterclockwise. Because the change of the force generated by the lower reactive magnet ring 23 can be ignored, the lower reactive pulley 33 still undergoes 350 N upward. Finally, in view of the lower reactive pulley 33, the three 75 N forces from the rope 41 go downward, so the force from the elastic component 310 in the center pulley 31 is decreased to 125 N (i.e., 350-75*3=125). Thus, the forces related to the rope 41 are balanced.

Further, because the center pulley 31 is rotated counterclockwise, the lower active magnet ring 22 is moved downward and the magnet force on it is also increased to 75 N. Symmetrically, the force from the elastic component 310 to the upper reactive pulley 33 is decreased to 125 N (i.e. the elastic component 310 provides 250 N totally). Thus, the forces related to the rope 42 are also balanced and the entire magnetic levitation device is balanced.

As a result, no matter what vertical changes are generated by any interference, with the elastic component 310, the magnetic levitation device can be balanced by itself.

Figure 9C:
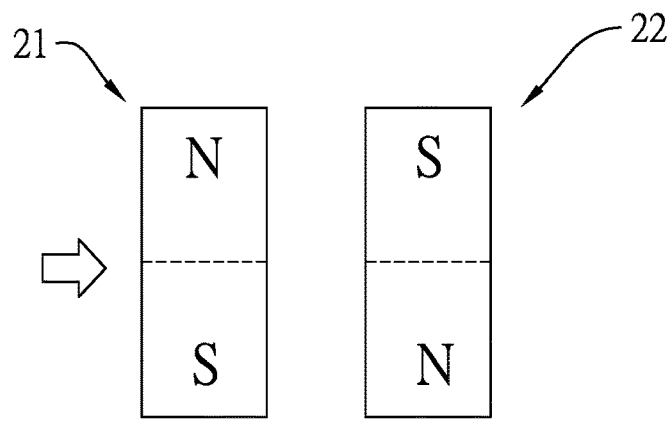
Figure 11C:
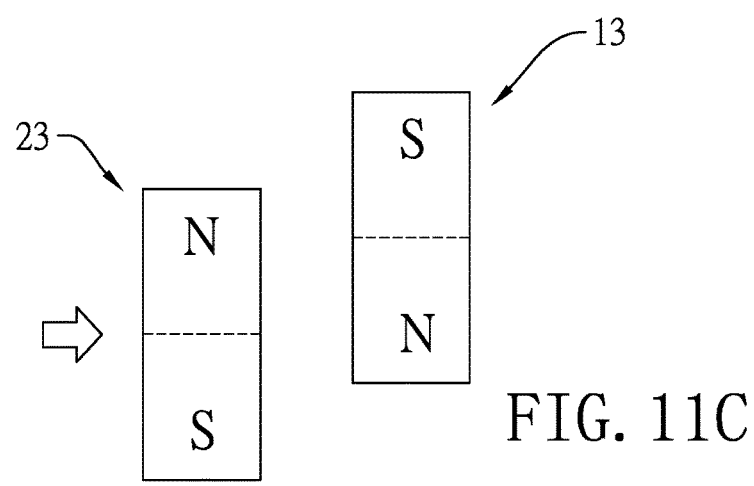

Please refer to FIG. 9C, FIG. 10C, and FIG. 11C. In Situation C, an interference exerts at the magnetic levitation device and the outer component 20 is moved horizontally. In the first magnet pair, the horizontal force is increased and the direction of the horizontal force is the same as the moving direction. In the second magnet pair, the horizontal force is increased from zero and the direction of the horizontal force is reverse to the moving direction. In the third magnet pair, the horizontal force is increased and the direction of the horizontal force is the same as the moving direction.

Then, because the combination magnet force of the two second magnet pairs is larger than the total magnet force of the first magnet pair and the two third magnet pairs, after the outer component 20 is displaced horizontally, the magnet forces in the two second magnet pairs (which are in a direction reverse to the displacement direction) are capable of surpassing the magnet forces in the first magnet pair and the two third magnet pairs (which are in the same direction to the displacement direction) and thus drawing the outer component 20 back to the neutral position. On the contrary, after the outer component 20 is displaced vertically, the magnet forces in the first magnet pair and the two second magnet pairs are also changed. As described above, the moving directions of the two active rings 22 are inverse to each other, so the magnet force changes in the two second magnet pairs are offset by each other. Further, the magnet forces of the third magnet pairs is much smaller than the magnet force in the first magnet pair. Thus, since the changes in the second magnet pairs and the third magnet pairs can be ignored, the magnet force in the first magnet pair is capable of drawing the outer component 20 back to the neutral position.

Figure 12:
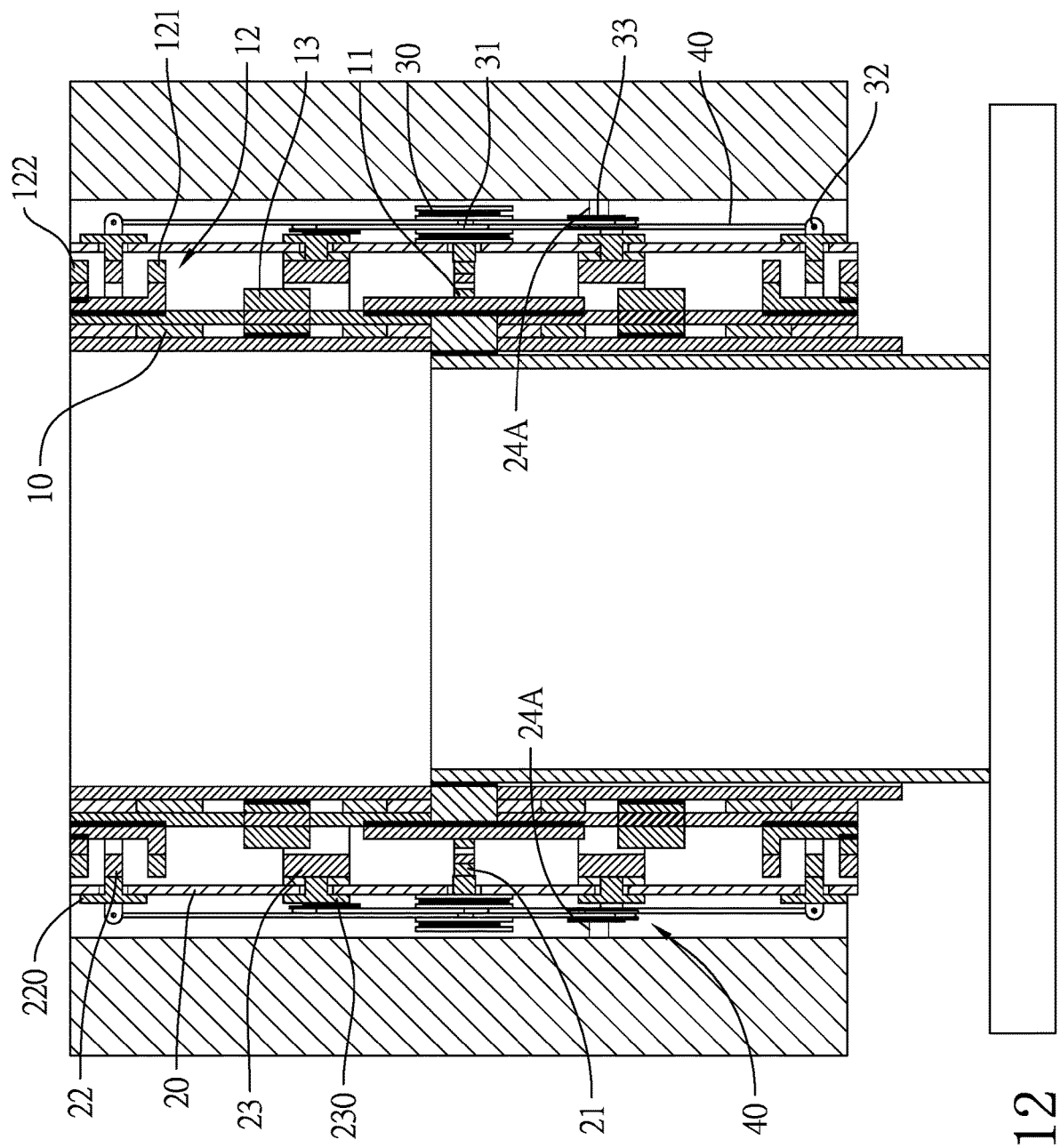
FIG. 12 is a side view of a magnetic levitation device in accordance with a second embodiment of the present invention.

With reference to FIG. 12, a magnetic levitation device in accordance with a second embodiment of the present invention is provided. The technical features in the second embodiment are almost the same as the technical features in the first embodiment, so the details disclosed above may be referenced in the second embodiment. The only difference is that the magnetic levitation device may not have the lower third magnet pair.

Precisely, the magnetic levitation device comprises an inner component 10A, an outer component 20A, a first magnet ring 11A, two groups of second magnet rings 12A, a third magnet ring 13A, a center magnet ring 21A, two active magnet rings 22A, a reactive magnet ring 23A, a loading component 24A, a plurality of pulley assemblies 30A, and two ropes 40A.

The outer component 20A is sleeved on the inner component 10A and a space is formed between the outer component 20A and the inner component 10A. The inner component 10A and the outer component 20A are capable of being rotated with respect to each other.

The first magnet ring 11A is securely mounted on the inner component 10A. The two groups of the second magnet rings 12A are securely mounted on the inner component 10A. The first magnet ring 11A is located between the two groups of the second magnet rings 12. Each group of the second magnet rings 12A comprises a closer second magnet ring 121A and a remoter second magnet ring 122A. The closer second magnet ring 121A and the remoter second magnet ring 122A are securely mounted on the inner component 10A. A distance between the remoter second magnet ring 122A and the first magnet ring 11A is larger than a distance between the closer second magnet ring 121A and the first magnet ring 11A. An interval formed between the closer second magnet ring 121A and the remoter second magnet ring 122A. The third magnet ring 13A is securely mounted on the inner component 10A, and located above the first magnet ring 11A and between the first magnet ring 11A and one of the groups of the second magnet rings 12A. Said group of the second magnet rings 12A is located above the first magnet ring 11A.

The center magnet ring 21A is securely mounted on the outer component 20A. The center magnet ring 21A is attracted by the first magnet ring 11A. The two active magnet rings 22A are moveably mounted on the outer component 20A and respectively located in the interval of a respective one of the two groups of the second magnet rings 12A. Each one of the active magnet rings 22A is attracted by the closer second magnet ring 121A and the remoter second magnet ring 122A of the corresponding group of the second magnet rings 12A.

The reactive magnet ring 23A is moveably mounted on the outer component 20A and above the center magnet ring 21A. A distance between the reactive magnet ring 23A and the center magnet ring 21A is slightly smaller than a distance between the first magnet ring 11A and the third magnet ring 13A and said third magnet ring 13A is above the first magnet ring 11. The reactive magnet ring 23A is attracted by the third magnet ring 13A.

The loading component 24A is configured to load external force. The loading component 24A is mounted on the outer component 20A and under the center magnet ring 21A.

The pulley assemblies 30A are mounted on the outer component 20A. Each one of the pulley assemblies 30A comprises a center pulley 31A, two fixing points 32A, and two reactive pulleys 33A. The center pulley 31A is securely mounted on the outer component 20A and aligned to the center magnet ring 21A. The two fixing points 32A are connected with a respective one of the active magnet rings 22A and thereby each one of the fixing points 32A is capable of being synchronously moved with the connected active magnet ring 22A. The two reactive pulleys 33A are respectively connected with the reactive magnet ring 23A and the loading component 24A, and thereby each one of the reactive pulleys 33A is capable of being synchronously moved with the connected reactive magnet ring 23A or the connected loading component 24A. The elastic component 310A is connected with the center pulley 31A.

The two ropes 40A are individually wrapped on the center pulley 31A, one end of each one of the ropes 40A is mounted on one of the fixing points 32A, and another end of said rope 40A is mounted on one of the reactive pulleys 33A.

In comparison with the first embodiment, the second embodiment does not comprise the third magnet pair under the first magnet pair. Instead, the loading component 24A substitutes the third magnet pair under the first magnet pair, and a weight object can be connected on the loading component 24A. Precisely, in the first embodiment, the third magnet pair under the first magnet pair provides the outer component 20A with a downward force. Similarly, in the second embodiment, the loading component 24A connected with a weight object also provides the outer component 20A with a downward force. As a result, the magnetic levitation device can be used as a bearing in a mechanism.

In another embodiment, the magnetic levitation device may comprise both the loading component and the lower third magnet ring.

Figure 13:
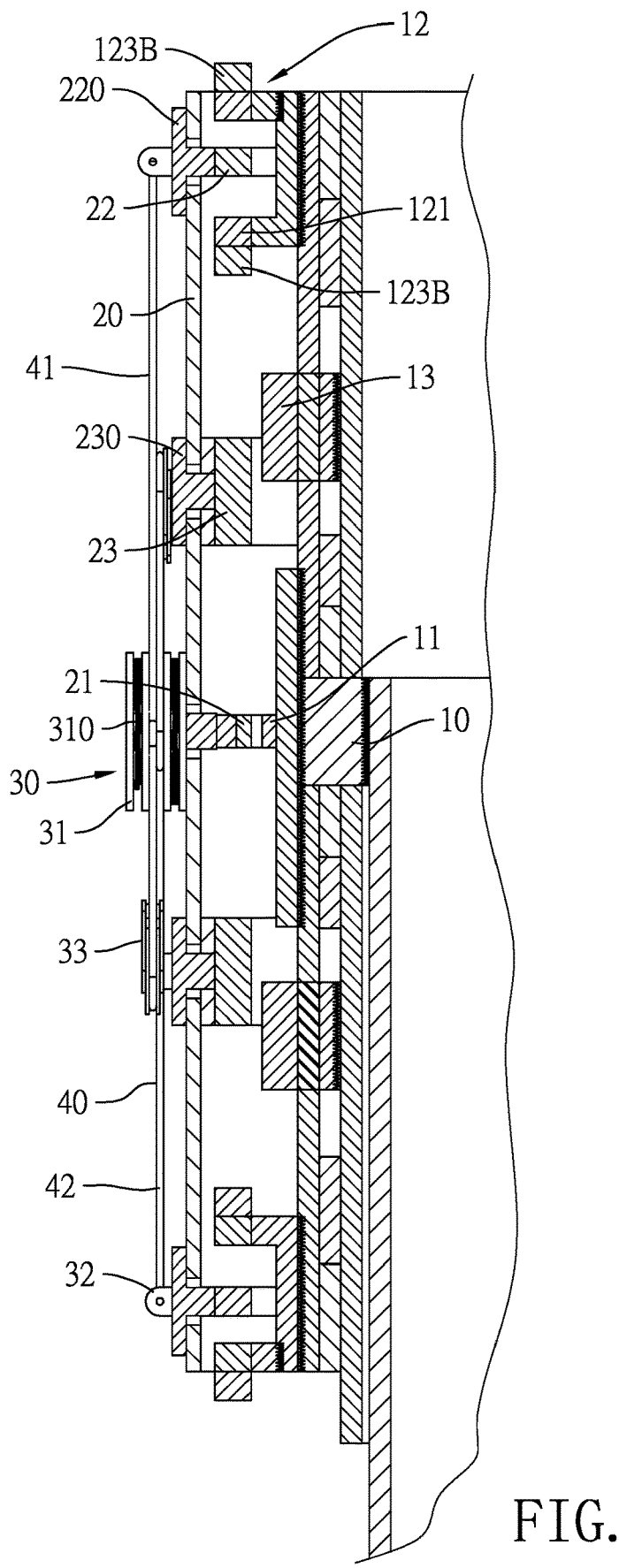
FIG. 13 is an enlarged sectional view of the magnetic levitation device in accordance with a third embodiment of the present invention.

With reference to FIG. 13, a magnetic levitation device in accordance with a third embodiment of the present invention is provided. The technical features in the third embodiment are almost the same as the technical features in the first embodiment or the second embodiment, so the details disclosed above may be referenced in the third embodiment. The only difference is that each one of the groups of the second magnet rings 12 further comprises at least one electromagnet 123B. The at least one electromagnet 123B is configured to enforce the closer second magnet ring 121 or the remoter second magnet ring 122, so the magnetic levitation device can bear a higher interference with the at least one electromagnet 123B. Besides, the at least one electromagnet 123B further prevents the corresponding second magnet ring 121/122 from magnetic hysteresis.

Precisely, in each group, the number of the electromagnet 123B may be two. Each electromagnet 123B may be ring-shaped as the closer second magnet ring 121 or the remoter second magnet ring 12. In this embodiment, one of the electromagnets 123B is mounted on the closer second magnet ring 121, and said electromagnet 123B is closer than the closer second magnet ring 121 with respect to the first magnet ring 11. The other one of the electromagnets 123B is mounted on the remoter second magnet ring 122, and the remoter second magnet ring 122 is closer than said electromagnet 123B with respect to the first magnet ring 11.

In another embodiment, the number of the electromagnets 123B may be one, or the at least one electromagnet 123B may be disclosed closer than the closer second magnet ring 121 with respect to the first magnet ring 11. In another embodiment, the magnetic levitation device may comprise the electromagnet 123B and the loading component 24A but does not comprise the lower third magnet pair.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A magnetic levitation device comprising:
an inner component;
a first magnet ring securely mounted on the inner component;
two groups of second magnet rings securely mounted on the inner component, the first magnet ring located between the two groups of the second magnet rings; each group of the second magnet rings comprising:
a closer second magnet ring securely mounted on the inner component;
a remoter second magnet ring securely mounted on the inner component, a distance between the remoter second magnet ring and the first magnet ring being larger than a distance between the closer second magnet ring and the first magnet ring; and
an interval formed between the closer second magnet ring and the remoter second magnet ring;
two third magnet rings securely mounted on the inner component, the first magnet ring located between the two third magnet ring, a distance between each one of the third magnet rings and the first magnet ring being smaller than a distance between each group of the second magnet rings and the first magnet ring;

an outer component sleeved on the inner component and a space formed between the outer component and the inner component, the inner component and the outer component capable of being rotated with respect to each other;

a center magnet ring securely mounted on the outer component, the center magnet ring attracted by the first magnet ring; and two active magnet rings moveably mounted on the outer component and respectively located in the intervals of the two groups of the second magnet rings, each one of the active magnet rings attracted by the closer second magnet ring and the remoter second magnet ring of the corresponding group of the second magnet rings;

two reactive magnet rings moveably mounted on the outer component, a distance between the two reactive magnet rings being smaller than a distance between the two third magnet rings, the two reactive magnet rings respectively attracted by the two third magnet rings;

a plurality of pulley assemblies mounted on the outer component, each one of the pulley assemblies comprising:
a center pulley securely mounted on the outer component and aligned to the center magnet ring;
two fixing points connected with a respective one of the active magnet rings and thereby each one of the fixing points being capable of being synchronously moved with the connected active magnet ring;
two reactive pulleys connected with a respective one of the reactive magnet rings and thereby each one of the reactive pulleys being capable of being synchronously moved with the connected reactive magnet ring; and
an elastic component connected with the center pulley; and two ropes wrapped on the center pulley, one end of each one of the ropes mounted on one of the fixing points, and another end of said rope mounted on one of the reactive pulleys.

2. The magnetic levitation device as claimed in claim 1 further comprising:
two active assembling rings movably mounted on the outer component and connected with a respective one of the active magnet rings, the two fixing points of each one of the pulley assemblies securely mounted on a respective one of the two active assembling rings, and thereby each one of the fixing points being capable of being synchronously moved with the corresponding active assembling ring and the corresponding active magnet ring; and
two reactive assembling rings movably mounted on the outer component and connected with a respective one of the reactive magnet rings, the two reactive pulleys of each one of the pulley assemblies securely mounted on a respective one of the two reactive assembling rings, and thereby each one of the reactive pulleys being capable of being synchronously moved with the corresponding reactive assembling ring and the corresponding reactive magnet ring.

3. The magnetic levitation device as claimed in claim 1, wherein each group of the second magnet rings comprises:
at least one electromagnet mounted on the remoter second magnet ring and a distance between the remoter second magnet ring and the first magnet ring being smaller than a distance between the at least one electromagnet and the first magnet ring.

4. The magnetic levitation device as claimed in claim 2, wherein each group of the second magnet rings comprises:
at least one electromagnet mounted on the remoter second magnet ring and a distance between the remoter second magnet ring and the first magnet ring being smaller than a distance between the at least one electromagnet and the first magnet ring.

5. The magnetic levitation device as claimed in claim 1, wherein each group of the second magnet rings comprises:
two electromagnets, one of the two electromagnets mounted on the remoter second magnet ring and a distance between the remoter second magnet ring and the first magnet ring being smaller than a distance between said electromagnet and the first magnet ring; the other one of the two electromagnets mounted on the closer second magnet ring and a distance between the closer second magnet ring and the first magnet ring being larger than a distance between said other one of the electromagnets and the first magnet ring.

6. The magnetic levitation device as claimed in claim 2, wherein each group of the second magnet rings comprises:
two electromagnets, one of the two electromagnets mounted on the remoter second magnet ring and a distance between the remoter second magnet ring and the first magnet ring being smaller than a distance between said electromagnet and the first magnet ring; the other one of the two electromagnets mounted on the closer second magnet ring and a distance between the closer second magnet ring and the first magnet ring being larger than a distance between said other one of the electromagnets and the first magnet ring.

7. A magnetic levitation device comprising:
an inner component;
a first magnet ring securely mounted on the inner component;
two groups of second magnet rings securely mounted on the inner component, the first magnet ring located between the two groups of the second magnet rings; each group of the second magnet rings comprising:
a closer second magnet ring securely mounted on the inner component;
a remoter second magnet ring securely mounted on the inner component, a distance between the remoter second magnet ring and the first magnet ring being larger than a distance between the closer second magnet ring and the first magnet ring; and
an interval formed between the closer second magnet ring and the remoter second magnet ring;
a third magnet ring securely mounted on the inner component, and located above the first magnet ring and between the first magnet ring and the group of the second magnet rings that is located above the first magnet ring;
an outer component sleeved on the inner component and a space formed between the outer component and the inner component, the inner component and the outer component capable of being rotated with respect to each other;
a center magnet ring securely mounted on the outer component, the center magnet ring attracted by the first magnet ring; and
two active magnet rings moveably mounted on the outer component and respectively located in the intervals of the two groups of the second magnet rings, each one of the active magnet rings attracted by the closer second magnet ring and the remoter second magnet ring of the corresponding group of the second magnet rings;

a reactive magnet ring moveably mounted on the outer component and above the center magnet ring, a distance between the reactive magnet ring and the center magnet ring smaller than a distance between the first magnet ring and the third magnet ring that is above the first magnet ring, the reactive magnet ring attracted by the third magnet ring;

a loading component configured to load external force, the loading component mounted on the outer component and under the center magnet ring;

a plurality of pulley assemblies mounted on the outer component, each one of the pulley assemblies comprising:

a center pulley securely mounted on the outer component and aligned to the center magnet ring;

two fixing points connected with a respective one of the active magnet rings and thereby each one of the fixing points being capable of being synchronously moved with the connected active magnet ring;

two reactive pulleys respectively connected with the reactive magnet ring and the loading component, and thereby each one of the reactive pulleys being capable of being synchronously moved with the connected reactive magnet ring or the connected loading component; and an elastic component connected with the center pulley; and two ropes wrapped on the center pulley, one end of each one of the ropes mounted on one of the fixing points, and another end of said rope mounted on one of the reactive pulleys.

\* \* \* \* \*